United States Patent Office 2,894,947
Patented July 14, 1959

2,894,947
PHENTHIAZINE DERIVATIVES

Robert Michel Jacob, Ablon-sur-Seine, and Gilbert Louis Regnier, Paris, France, assignors to Societe des Usines Chimiques Rhone-Poulenc, Paris, France, a corporation of France No Drawing. Application July 22, 1957
Serial No. 673,152

Claims priority, application France August 1, 1956

6 Claims. (Cl. 260—243)

This invention relates to new derivatives of phenthiazine and to processes for their production.

It is known that various 10-aminoalkyl-phenthiazines, -oxyphenthiazines and -dioxyphenthiazines, possess interesting therapeutic properties. Extensive research and experimentation has shown, however, that both the size of the therapeutic index and the nature of the therapeutic effect exhibited by certain compounds of this type can radically be changed (even eliminated) by even small changes in chemical structure. Particularly is this the case with variations in the nature and length of the side chain attached to the 10-position nitrogen atom and with positional substitution in the phenthiazine nucleus.

It is an object of the present invention to provide new phenthiazine derivatives which possess useful pharmacological properties. It is a further object of the invention to provide processes for the production of these new compounds.

The phenthiazine derivatives of the present invention are those which conform to the formula:

[Structure I: phenthiazine with positions numbered 1–9, X at position 9, $SO_2-N(CH_3)_2$ at position 3, and $-A-N(R_1)(R_2)$ on N]

I and their salts and their quaternary ammonium derivatives, wherein X represents a sulphur atom or an SO or $SO_2$ group, $R_1$ and $R_2$ are the same or different and either each represents a lower alkyl group or one of $R_1$ and $R_2$ represents a hydrogen atom and the other represents a lower alkyl group or $R_1$ and $R_2$ together with the adjacent nitrogen atom collectively represent a heterocyclic group such as pyrrolidino, piperidino, morpholino, piperazino, 4-alkylpiperazino, 4-hydroxyalkylpiperazino or 4-acyloxyalkylpiperazino, and A represents a straight or branched chain divalent aliphatic hydrocarbon group containing two to five carbon atoms (such, for example, as ethylene, propylene, isobutylene, trimethylene and tetramethylene) unsubstituted or substituted by a group $$-B-N\begin{matrix}R_1\\R_2\end{matrix}$$

wherein B represents a single bond or a methylene group and $R_1$ and $R_2$ are as hereinbefore defined, the nitrogen atoms of the phenthiazine nucleus and of the grouping $$-N\begin{matrix}R_1\\R_2\end{matrix}$$

being separated by at least two carbon atoms. It is to be understood that the radicals $R_1$ and $R_2$ in the grouping $$-B-N\begin{matrix}R_1\\R_2\end{matrix}$$

need not be identical with the correspondingly designated radicals in the grouping $$-A-N\begin{matrix}R_1\\R_2\end{matrix}$$

The term "lower alkyl" as used in this specification and in the appended claims means that the alkyl group in question contains not more than five carbon atoms.

The new phenthiazine compounds of the present invention may be prepared by the application of methods known per se for the production of 10-aminoalkyl-phenthiazines. The majority of methods so applied can be described generically as consisting in reacting a phenthiazine derivative of general formula:

[Structure II: phenthiazine with X, $SO_2-N(CH_3)_2$ substituent, and P on N]

II with a compound Q, the groups P and Q being such that Q will react with the phenthiazine derivative so as to introduce the substituent $$-A-N\begin{matrix}R_1\\R_2\end{matrix}$$

or a substituent easily convertible into $$-A-N\begin{matrix}R_1\\R_2\end{matrix}$$

in the 10-position and, if necessary, thereafter transforming the convertible substituent into $$-A-N\begin{matrix}R_1\\R_2\end{matrix}$$

Preferred processes of manufacture are as follows:

(1) Interaction of a 3-dimethylsulphamoylphenthiazine of the general formula:

[Structure III: phenthiazine with X and $SO_2-N(CH_3)_2$, H on N]

III (wherein X is as hereinbefore defined) with a reactive ester of an amino-alcohol of the formula:

$$Y-A-N\begin{matrix}R_1\\R_2\end{matrix}$$

IV (where Y represents the acid residue of a reactive ester such as a halogen atom or a sulphuric or sulphonic ester residue and the other symbols are as hereinbefore defined) in the form of the base or of a salt thereof.

The reaction may be carried out with or without a solvent and in the presence or absence of a condensing agent. It is advantageous to operate in an aromatic hydrocarbon solvent medium (for example, benzene, toluene or xylene) in the presence of a condensing agent, preferably in the form of an alkali metal or derivative thereof (such as, for example, hydride, amide, hydroxide, alcoholate or metal alkyl or aryl) and especially in the form of metallic sodium, sodamide, powdered sodium or potassium hydroxide, lithium hydride, sodium tert-butylate, butyllithium or phenyllithium. The reaction is preferably carried out at the boiling temperature of the solvent. It is advantageous to use the halogenoamine in the form of the free base in solution, for example, in benzene, toluene or xylene, and to add this to the mixture of the other reactants in which the phenthiazine reactant of Formula III may already be present, at least in part, in the form of an alkali metal salt. The reaction may also be carried out using a salt of the halogenoamine but in this case a greater proportion of the condensing agent must clearly be used in order to neutralise the acid of the salt employed.

In the case where the divalent aliphatic hydrocarbon group —A— is an asymmetric branched chain, such for example as

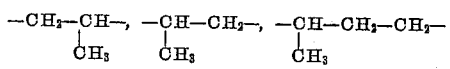

or

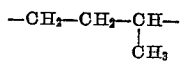

isomerisation can take place during the course of the reaction with the formation of a mixture of isomers. This isomerisation is analogous to that which takes place in the preparation of promethazine by the condensation of phenthiazine with a dimethylaminohalogenopropane [Charpentier, C.R. 225, 306 (1947)], a process which, using either 2-dimethylamino-1-chloropropane or 1-dimethylamino-2-chloropropane as starting material, gives the same final mixture in which promethazine predominates. Separation of the isomers may be effected by, for example, fractional crystallisation of salts such as the hydrochlorides from a suitable solvent such as alcohol.

(2) Decomposition of an aminoalkylphenthiazine-10-carboxylate of the formula:

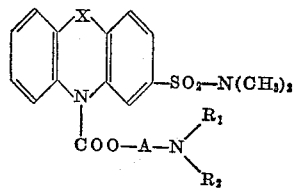

(wherein the various symbols are as hereinbefore defined) by heating the carboxylate to a temperature above 100° C., and preferably between 150 and 220° C. There is no advantage in operating at higher temperatures which, in any event, can cause discoloration of the reaction products.

The reaction can be effected with the phenthiazine-10-carboxylate alone, i.e. without a diluent, or in an inert medium such as a chlorinated aliphatic hydrocarbon, o-dichlorobenzene, diphenyl or diphenyl oxide, or in the classical diluents for decarboxylation, such, for example, as quinoline or weak bases of high boiling point.

During the course of the decomposition of the phenthiazine-10-carboxylate an isomerisation, similar to that hereinbefore described in process (1), takes place when the divalent aliphatic hydrocarbon group A is an asymmetric branched chain.

The phenthiazine-10-carboxylates employed as starting maetrials may be obtained by known methods. For example, they may be prepared by the action of a halide (or an ester) of a 3-dimethylsulphamoylphenthiazine-10-carboxylic acid on the appropriate aminoalcohol; or by the action of a halogenoalkyl ester of such an acid on an appropriate amine.

(3) Interaction of an amine of the formula

(wherein $R_1$ and $R_2$ are as hereinbefore defined) and a reactive ester of the general formula

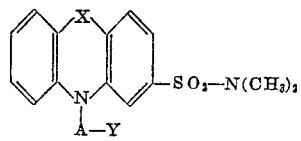

(wherein A, X and Y are as hereinbefore defined).

(4) Alkylation by known methods of the corresponding primary or secondary amines, i.e. those compounds of Formula I in which the grouping

represents groups such as amino, monoalkylamino or piperazino, leading to the production of compounds in which the grouping

represents such groups as alkylamino, dialkylamino-, 4-alkylpiperazino, 4-hydroxyalkylpiperazino or 4-acyloxyalkylpiperazino.

(5) Reduction of an amide of the general formula:

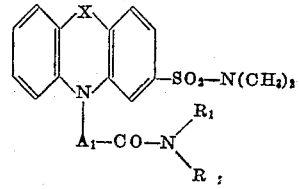

(where $A_1$ is such that $A_1$—$CH_2$— represents the group A, A and the other symbols being as hereinbefore defined) using standard methods, preferably using lithium aluminium hydride in a solvent such as tetrahydrofuran.

(6) Reduction in the presence of an amine of the general formula $HNR_1R_2$ (where $R_1$ and $R_2$ are as hereinbefore defined) of a phenthiazine derivative of the general formula:

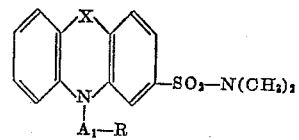

(wherein R represents the group CN or the group CHO, and X and $A_1$ are as hereinbefore defined), which may be effected with molecular hydrogen in the presence of a catalyst.

(7) In the case of compounds of general Formula I where X represents a sulphur atom, cyclisation by means of sulphur or of one of its derivatives of a diphenylamine of the general formula:

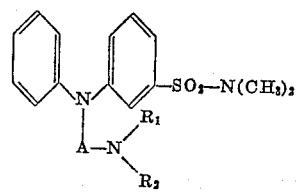

(wherein A, $R_1$ and $R_2$ are as hereinbefore defined) preferably in the presence of a catalyst, for example iodine. The sulphur can be used as such (e.g. flowers of sulphur) or in the nascent state (e.g. thiosulphate). As a derivative of sulphur, a halogen derivative may be employed.

(8) Cyclisation, preferably in a solvent in the form of a substituted amide of a lower aliphatic acid such as formamide or acetamide, or in dimethylaniline, in the presence of a condensing agent (alkali metal hydroxide or carbonate) and optionally in the presence of a catalyst such as copper powder, of a derivative of general formula:

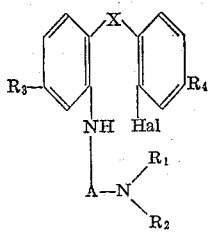

(wherein one of the groups $R_3$ and $R_4$ represents a hydrogen atom and the other a dimethylsulphamoyl group, Hal represents a halogen atom (for example, chlorine or bromine) and the other symbols are as hereinbefore defined).

(9) In the case of the 4-acyloxyalkylpiperazino derivatives, acylation of the derivatives in which the grouping

is 4-hydroxyalkylpiperazino.

(10) In the case where X represents an SO or $SO_2$ group, oxidation by known methods of the corresponding phenthiazine compounds (X=S) of general Formula I.

Certain of the compounds conforming to general Formula I have an asymmetric carbon atom in the chain A, such as those compounds with the branched chain

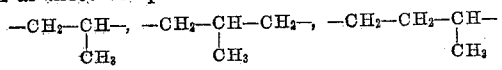

or

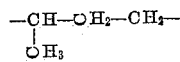

and consequently can exist in optically active forms. The invention includes within its scope the racemates as well as the corresponding optically active isomers of such compounds. The optically active isomers may be obtained by e.g. methods (1) and (3) described above by commencing with starting materials which are themselves optically active. They may also be prepared by optical resolution of the corresponding racemates.

The products prepared according to the invention have valuable pharmacodynamic properties. They have, in particular, a powerful action on the central nervous system which renders them generally useful as neuroleptics, as potentiators of general anaesthetics (for example, hexobarbitone and ether) and analgesics (for example, morphine), antiemetics and catatonic agents. Certain of them are also spasmolytics, hypotensors or antihistaminics.

For therapeutic purposes, the bases of general Formula I are preferably employed in the form of acid addition salts containing pharmaceutically acceptable anions (such as hydrochlorides and other hydrohalides, 8-chlorotheophyllinates, phosphates, nitrates, sulphates, maleates, fumarates, citrates, tartrates, oxalates, methanesulphonates and ethanedisulphonates) or of quaternary ammonium salts obtained by reaction with organic halides (e.g. methyl or ethyl iodide, chloride or bromide or allyl or benzyl chloride or bromide) or other reactive esters conveying pharmaceutically acceptable anions.

The following examples show how the invention may be put into practice. The melting points stated were determined on the Kofler bench.

Example I

A solution of 3-dimethylsulphamoylphenthiazine (8 g.) in anhydrous xylene (150 cc.) is heated under reflux for 1 hour with sodamide (1.2 g.). A solution of 3-dimethylamino-2-methyl-1-chloropropane (3.52 g.) in anhydrous xylene (10 cc.) is then added and heating under reflux continued for 21 hours. After cooling, the suspension obtained is agitated with water (150 cc.) and ether (75 cc.). The basic products are then extracted several times with dilute sulphuric acid.

After making the combined acid solutions alkaline with sodium hydroxide ($d=1.33$), the base is extracted several times with ether. The combined ethereal solutions are washed with water and dried over sodium sulphate. After evaporation of the solvent under reduced pressure a crude oily base (10 g.) is obtained. After chromatography of this base on alumina and addition of ethereal hydrogen chloride to an acetone solution of the base, 3-dimethylsulphamoyl-10-(3-dimethylamino-2-methylpropyl)phenthiazine hydrochloride (2.5 g.) is obtained, M.P. 236° C. after recrystallisation from ethanol.

3-dimethylsulphamoylphenthiazine (M.P. 174° C.) may be obtained by the cyclisation of 2-bromo-2'-amino-4'-dimethylsulphamoyldiphenyl sulphide (M.P. 140° C.) itself obtained by reduction with iron powder and acetic acid of 2-bromo-2'-nitro-4'-dimethylsulphamoyldiphenyl sulphide, M.P. 135° C., itself obtained by the Sandmeyer reaction commencing with 2-amino-2'-nitro-4'-dimethylsulphamoyldiphenyl sulphide, M.P. 163° C.

Example II

A solution of 3-dimethylsulphamoylphenthiazine (5 g.) in anhydrous xylene (100 cc.) is heated under reflux for 1 hour with sodamide (0.67 g.). 3-dimethylamino-1-chloropropane (1.98 g.) in solution in anhydrous xylene (20 cc.) is added and the mixture heated under reflux for 5 hours. After treatment of the reaction products as in Example I a crude oily base (3.4 g.) is obtained. By the addition of a solution of anhydrous oxalic acid in ethanol to an ethanolic solution of this base, 3-dimethylsulphamoyl - 10 - (3 - dimethylaminopropyl)phenthiazine acid oxalate (2.4 g.) is obtained after recrystallisation of the product in ethanol, M.P. 195° C.

Example III

Proceeding as in Example II but commencing with 3-dimethylsulphamoylphenthiazine (5 g.) and 3-(4-methyl-1-piperazinyl)-1-chloropropane (3.2 g.), a crude oily base (2.5 g.) is obtained after treatment. By the addition of a solution of fumaric acid in ethanol to an ethanolic solution of the base, 3-dimethylsulphamoyl-10-(3-4'-methyl-1'-piperazinylpropyl)-phenthiazine di-acid fumarate (2.6 g.) is obtained, M.P. 182° C. The base recrystallised from ethyl acetate melts at about 140° C.

Example IV

A solution of 3-dimethylsulphamoylphenthiazine (15.3 g.) in anhydrous xylene (200 cc.) is heated under reflux for 3 hours with sodamide (4 g.). A solution of 3-(4-ethyl-1-piperazinyl)-1-chloropropane (10.9 g.) in anhydrous xylene (75 cc.) is then added and refluxing is continued for 4 hours. After cooling, the suspension obtained is shaken with water (100 cc.) and chloroform (50 cc.). The aqueous layer is separated and the basic products are extracted from the organic phase with dilute sulphuric acid. The chloroform layer is removed. After rendering the combined acid solutions alkaline with sodium hydroxide ($d=1.33$), the base is extracted with chloroform. The chloroform solution is washed with water and dried over anhydrous potassium carbonate. After evaporation of the solvent under reduced pressure a crude resinous base (14.8 g.) is obtained which is treated with boiling ether (100 cc.). The crystalline product obtained is recrystallized from isopropanol and there is finally obtained 3-dimethylsulphamoyl-10-(3-4'-ethyl-1'-piperazinylpropyl)phenthiazine (6.7 g.), M.P. 112° C.

Example V

A solution of 3-dimethylsulphamoylphenthiazine (10 g.) in xylene (100 cc.) is heated under reflux for 3 hours with sodamide (1.5 g.). A solution of 1-dimethylamino-2-chloropropane (4.4 g.) in anhydrous xylene (30 cc.)

is then added and heating under reflux continued for 4 hours. After cooling the suspension obtained is agitated with water (50 cc.) and ether (30 cc.). The aqueous layer is separated and the basic products are extracted from the organic phase with 10% hydrochloric acid. The xylene layer is discarded and, after the combined acid solutions have been made alkaline with sodium carbonate, the base is extracted with chloroform. The chloroform solutions are then washed with water and dried over anhydrous potassium carbonate. After evaporation of the solvent under reduced pressure there is obtained a crude resinous base (9.7 g.).

On the addition of ethereal hydrogen chloride to a solution of the base in isopropanol and recrystallisation from anhydrous ethanol of the salt formed, there is obtained 3 - dimethylsulphamoyl - 10 - (2 - dimethylaminopropyl)phenthiazine hydrochloride (2.1 g.), M.P. 214° C. with decomposition.

*Example VI*

Proceeding as in Example V but commencing with 3-dimethylsulphamoylphenthiazine (10.7 g.) and 3-1'-pyrrolidinyl-1-chloropropane (5.65 g.), there is obtained after treatment of the reaction mixture a crude oily base (7.8 g.). On the addition of ethereal hydrogen chloride to a solution of the base in acetone and recrystallisation from acetone of the salt formed, there is obtained 3-dimethylsulphamoyl - 10 - (3 - 1' - pyrrolidinylpropyl)phenthiazine hydrochloride (3.3 g.), M.P. 140° C. (inst.) with decomposition.

*Example VII*

Proceeding as in Example V but commencing with 3-dimethylsulphamoylphenthiazine (12.25 g.) and 3-morpholino-1-chloropropane (7.2 g.), there is obtained after treatment of the reaction mixture a crude oily base (9.8 g.). On the addition of an ethanolic solution of oxalic acid to an ethanolic solution of the base and recrystallisation from aqueous methanol of the salt formed, there is obtained the neutral oxalate of 3-dimethylsulphamoyl-10-(3-morpholinopropyl)phenthiazine (5.3 g.), M.P. 215° C. with decomposition.

*Example VIII*

A solution of 3-dimethylsulphamoylphenthiazine (15 g.) in anhydrous xylene (200 c.) is heated under reflux for 3 hours with sodamide (2.46 g.). A solution of 3-(4 - methyl - 1 - piperazinyl) - 2 - methyl - 1 - chloropropane (10.3 g.) in anhydrous xylene (50 cc.) is then added and heating under reflux continued for 19 hours. After cooling, the suspension obtained is agitated with water (150 cc.) and chloroform (50 cc.). The aqueous layer is separated and the basic products are extracted from the organic phase with dilute sulphuric acid. The chloroform layer is discarded and the combined aqueous acid solutions are made alkaline with sodium hydroxide solution (d=1.33).

The base is extracted with chloroform and the chloroform solutions are then washed with water and dried over anhydrous potassium carbonate. After evaporation of the solvent under reduced pressure, there is obtained a crude crystalline base (12.2 g.) which is purified by recrystallisation from isopropanol. There is finally obtained 3 - dimethylsulphamoyl-10-(3-4'-methyl-1'-piperazinyl-2-methylpropyl)phenthiazine (6.6 g.), M.P. 150° C.

*Example IX*

3 - dimethylsulphamoyl - 10 - (3 - toluene - p - sulfonyloxypropyl)phenthiazine (14.7 g.) in anhydrous toluene (210 cc.) is heated at 110° C. for 2 hours with 1-(2-hydroxyethyl)piperazine (8 g.). After cooling the crystalline suspension obtained is diluted with ether (100 cc.) and washed several times with water. After separation of the aqueous layer, the basic products of the organic layer are extracted with 10% sulphuric acid. The organic layer is separated and the combined acid solutions made alkaline with sodium hydroxide (d=1.33). The base is extracted several times with chloroform, and the chloroform solutions are then washed with water and dried over potassium carbonate. After evaporating the solvent under reduced pressure, a crude resinous base (8.3 g.) is obtained which is purified after dissolution in a mixture of benzene and cyclohexane by passage through an alkaline alumina column. After eluting with mixtures of benzene and ethyl acetate and evaporating the eluents an orange-yellow resin is recovered (5.17 g.).

After dissolving the product in anhydrous ethanol and adding methanesulphonic acid there is obtained 3-dimethylsulphamoyl - 10 - (3 - 4' - hydroxyethyl - 1' - piperazinylpropyl)phenthiazine dimethanesulphonate (15.8 g.), M.P. 218–219° C.

The initial 3-dimethylsulphamoyl-10-(3-toluene-p-sulphonyloxypropyl)phenthiazine may be prepared by the condensation in pyridine at 0° C. of toluene-p-sulphonyl chloride with 3-dimethylsulphamoyl-10-(3-hydroxypropyl)phenthiazine, itself obtained by the acid hydrolysis of 3-dimethylsulphamoyl-10-(3-tetrahydropyranyloxypropyl)phenthiazine, obtained by the condensation in boiling xylene in the presence of sodamide of 3-tetrahydropyranyloxy-1-chloropropane and 3-dimethylsulphamoyl-phenthiazine.

*Example X*

A solution of 3-dimethylsulphamoyl-10-(3-toluene-p-sulphonyloxypropyl)phenthiazine (5.2 g.) in anhydrous toluene (100 cc.) is heated with anhydrous monomethylamine (3.1 g.) in an autoclave for 4 hours at 110° C. After cooling, the crystalline suspension obtained is diluted with ether (25 cc.) and washed several times with water. After separation of the aqueous layer the basic products are extracted from the organic layer with 10% hydrochloric acid. The organic layer is separated and the combined acid solutions are made alkaline with sodium carbonate. The base is extracted several times with chloroform. The chloroform solutions are then washed with water and dried over anhydrous potassium carbonate. After evaporation of the solvent under reduced pressure there is obtained a crude oily base (3.2 g.).

On the addition of ethereal hydrogen chloride to a solution of the base in acetone there is obtained 3-dimethylsulphamoyl - 10 - (3-methylaminopropyl)phenthiazine hydrochloride (2.3 g.), M.P. 151° C. (inst.) with decomposition.

*Example XI*

Proceeding as in Example X but commencing with 3-dimethylsulphamoylphenthiazine (5.2 g.) and 1-(3-hydroxypropyl)piperazine (3 g.), there is obtained after treatment of the reaction mixture a crude resinous base (3.4 g.) which is crystallised from solution in a mixture of ethanol and ether. There is obtained 3-dimethylsulphamoyl - 10 - [3-(4-3'-hydroxypropyl-1-piperazinyl)propyl]phenthiazine (2.4 g.), M.P. 139° C.

*Example XII*

3-dimethylsulphamoyl-10-(3-4' - hydroxyethyl-1'-piperazinylpropyl)-phenthiazine (1.6 g.) is heated under reflux for 1½ hours with acetic anhydride (2 cc.) and pyridine (15 cc.). After evaporation of the solvent in vacuo the resin obtained is taken up in chloroform (20 cc.) and washed with water (20 cc.) containing potassium carbonate (1 g.)  After two extractions of the aqueous alkaline liquid with chloroform, the chloroform solutions are combined and washed several times with water. The chloroform solution is then dried over anhydrous potassium carbonate and the solvent distilled off under reduced pressure. A crude resinous base (1.85 g.) is then obtained.

By the addition of moleic acid to an ethanolic solution of this base, 3-dimethylsulphamoyl-10-(3,4'-acetoxyethyl-1'-piperazinylpropyl)-phenthiazine di-acid maleate (2 g.), M.P. 180–182° C., is obtained.

Example XIII

3 - (4-methyl-1-piperazinyl)propyl 3-dimethylsulphamoylphenthiazine-10-carboxylate (12.4 g.) in o-dichlorobenzene (125 cc.) is heated under reflux for 3 hours. At the end of 3 hours the release of carbon dioxide ceases. After cooling the solution is diluted with ether (100 cc.) and washed several times with water. The basic products are then extracted from the organic layer with 10% sulphuric acid. The acid extracts are combined, made alkaline with sodium hydroxide ($d=1.33$) and extracted several times with chloroform. The chloroform solutions are washed with water and dried over potassium carbonate. By evaporation of the solvent under reduced pressure a crude resinous base is obtained which is redissolved in benzene. The benzene solution is passed through an alkaline alumina column. After elution with mixtures of benzene and ethyl acetate and evaporation of the solvents, there is finally obtained 3-dimethylsulphamoyl - 10 - (3-4'-methyl-1'-piperazinylpropyl)phenthiazine (0.8 g.), M.P. 140° C.

The initial ester, the di-acid maleate of which melts at 188–189° C., can be obtained by the condensation, in toluene under reflux, of 3-(4-methyl-1-piperazinyl)propanol with 3-dimethylsulphamoylphenthiazine - 10 - carbonyl chloride, M.P. 145° C., itself prepared by the action of phosgene on 3-dimethylsulphamoylphenthiazine in toluene in the presence of pyridine.

Example XIV

1:3-bis-dimethylamino-2-propyl 3-dimethylsulphamoylphenthiazine-10-carboxylate (10 g.) dissolved in o-dichlorobenzene (100 cc.) is heated under reflux for 1½ hours. At the end of this time, the evolution of carbon dioxide having ceased, the solution is cooled, diluted with ether (200 cc.) and washed several times with water. The basic products are then extracted from the organic layer with 10% hydrochloric acid. The acid extracts are combined, made alkaline with sodium carbonate and extracted several times with ether. The ethereal solutions are washed with water and dried over anhydrous potassium carbonate. On evaporation of the solvent under reduced pressure there is obtained a crude base which is purified by recrystallisation from isopropanol. There is thus obtained 3-dimethylsulphamoyl-10-(2:3 - bis - dimethylaminopropyl)phenthiazine (4.85 g.), M.P. 133° C.

The initial ester (dihydrochloride, M.P. 213–214° C. with decomposition) may be prepared by condensation in toluene under reflux of 1:3-bis-dimethylamino-2-propanol with 3-dimethylsulphamoylphenthiazine - 10 - carbonyl chloride.

Example XV 3-dimethylsulphamoyl - 10 - (3-aminopropyl)phenthiazine (3.3 g.) dissolved in dioxan (30 cc.) is neutralised with N hydrochloric acid (9.1 cc.). A 30% aqueous solution of formaldehyde (22 cc.) and platinum oxide (0.2 g.) are added to this solution which is then agitated vigorously under a slight pressure of hydrogen and at room temperature for 48 hours. After removal of the platinum by filtration and evaporation of the solvent under reduced pressure the residue is treated with N hydrochloric acid (50 cc.). Insoluble matter is filtered off, and the mixture is made alkaline with sodium carbonate and extracted with chloroform. After drying over sodium sulphate the chloroform is removed in vacuo and there is thus obtained 3-dimethylsulphamoyl-10-(3-dimethylaminopropyl)phenthiazine (0.4 g.), the methanesulphonate of which melts at 172° C.

3-dimethylsulphamoyl - 10 - (3-aminopropyl)phenthiazine employed as starting material may be prepared as follows:

3 - dimethylsulphamoyl-10-(2-cyanoethyl)phenthiazine (10 g.), M.P. 143° C., dissolved in ethanol (90 cc.) is hydrogenated for 24 hours at 50° C. under 30 atmospheres of hydrogen in the presence of Raney nickel (1 g.) and ammonia (3.5 g.). When the uptake of hydrogen has ceased the alcoholic solution is filtered and then concentrated to dryness under reduced pressure. The resinous product obtained is dissolved in a mixture of benzene and cyclohexane and then filtered through a column of alkaline alumina. After successive elutions with a mixture of benzene and cyclohexane, pure benzene and a mixture of benzene and ethyl acetate, the eluates obtained from the last mentioned mixture are evaporated under reduced pressure. A crude resinous base (4.8 g.) is obtained. On the addition of an ethanolic solution of oxalic acid to an ethanolic solution of the base and recrystallisation from aqueous ethanol of the salt formed there is obtained 3-dimethylsulphamoyl-10-(3-aminopropyl)phenthiazine oxalate (1.94 g.), M.P. 205° C. (inst.), which is then converted into the base.

The 3-dimethylsulphamoyl-10-(2-cyanoethyl)phenthiazine is prepared in a manner similar to that described by Smith, J. Org. Chem., 15, 1129 (1950) by the condensation of acrylonitrile with 3-dimethylsulphamoylphenthiazine.

Example XVI

3 - dimethylsulphamoyl - 10 - (2 - cyanoethyl)phenthiazine, M.P. 143° C. (7.2 g.) is dissolved in ethanol (100 cc.), then dimethylamine (10 g.) and a 10% palladium on barium sulphate catalyst (15 g.) are added. The mixture is agitated in a hydrogen pressure of 2 to 3 kg./cm.$^2$ until the uptake of hydrogen is complete. The catalyst is filtered off, the ethanol is evaporated and the residue is treated with ether. The ethereal solution is extracted with dilute hydrochloric acid, the aqueous layer is made alkaline with sodium carbonate and the oil which separates is extracted with chloroform. On evaporation of the chloroform there is obtained 3-dimethylsulphamoyl-10 - (3 - dimethylaminopropyl)phenthiazine (3 g.), the methanesulphonate of which melts at 172° C.

Example XVII

2 - bromo 2' - (3 - dimethylamino - 2 - methylpropyl)amino-4'-dimethylsulphamoyldiphenyl sulphide (8.1 g.) dissolved in dimethylformamide (50 cc.) is boiled for 12 hours in the presence of anhydrous potassium carbonate (2.5 g.) and copper powder (0.2 g.). When the reaction is complete all the solvent is removed by distillation under reduced pressure and the reaction mass is then treated with water (180 cc.) and chloroform (120 cc.). The aqueous layer is separated and the basic products are extracted from the organic phase with 10% hydrochloric acid. The chloroform layer is discarded and the combined acid solutions are made alkaline with potassium carbonate. The base is extracted several times with ether and the ethereal solutions are then washed with water and dried over anhydrous potassium carbonate. After evaporation of the solvent under reduced pressure there is obtained a crude resinous base (1.05 g.) which is purified by dissolving in a mixture of equal parts of benzene and cyclohexane and filtering through a column of alkaline alumina. After elution with a mixture of the same proportions and evaporation of the eluates there is obtained a resinous base (0.53 g.). On dissolving in ethyl acetate and precipitating with ethereal hydrogen chloride there is obtained 3-dimethylsulphamoyl-10-(3-dimethylamino-2-methylpropyl)phenthiazine hydrochloride which may be recrystallised from ethanol, M.P. 235–236° C. The corresponding picrate melts at 187–188° C.

The 2 - bromo - 2' - (3 - dimethylamino - 2 - methylpropyl)amino - 4' - dimethylsulphamoyldiphenyl sulphide may be prepared by condensation of 3-dimethylamino-2-methyl-1-chloropropane with 2-bromo-2'-amino-4'-dimethylsulphamoyldiphenyl sulphide in xylene under reflux in the presence of sodamide.

Example XVIII

3 - dimethylsulphamoyl - 10 - (3 - 4' - methyl- 1' - piperazinylpropyl)-phenthiazine (20 g.) dissolved in acetic acid (150 cc.) is treated at 10° C. with 34% hydrogen peroxide (4.5 g.) and sulphuric acid (2.48 cc.) dissolved in acetic acid (44 cc.). After standing for 48 hours at room temperature the resulting solution is poured into water (1 litre). The mixture is made alkaline with sodium carbonate and the base is extracted several times with chloroform. The chloroform solutions are then washed with water and dried over anhydrous potassium carbonate. After evaporation of the solvent under reduced pressure the crystalline product obtained is purified by successive crystallisations from ethyl acetate and acetone. There is finally obtained 3-dimethylsulphamoyl-9-oxy-10-(3-4'-methyl-1'-piperazinylpropyl)phenthiazine (9.7 g.) which occurs in two dimorphic forms, one melting at 153° C. and the other at 161–162° C.

We claim:

1. A member of the class consisting of phenthiazine derivatives of the general formula:

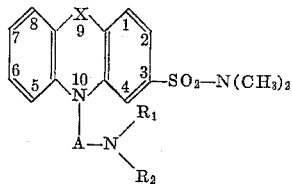

and their acid addition salts having pharmaceutically acceptable anions where X is selected from the class consisting of a sulphur atom and an SO and $SO_2$ group, $R_1$ and $R_2$ when individual groups each is a member of the class consisting of lower alkyl groups and a hydrogen atom with at least one representing a lower alkyl group and $R_1$ and $R_2$ when taken together with the adjacent nitrogen atom collectively represent a mononuclear heterocyclic group selected from the class consisting of pyrrolidino, piperidino, morpholino, piperazino, 4-lower alkyl piperazino, 4-ω-lower hydroxyalkyl piperazino and 4-ω-acetoxyalkyl piperazino groups, and A represents a divalent, saturated, wholly aliphatic hydrocarbon group containing two to five carbon atoms of which at least two constitute a chain between the nitrogen atoms to which the group A is connected.

2. 3 - dimethylsulphamoyl - 10 - (3 - dimethylamino - 2-methylpropyl)phenthiazine.

3. 3 - dimethylsulphamoyl - 10 - (3 - dimethylaminopropyl)phenthiazine.

4. 3 - dimethylsulphamoyl - 10 - (3 - 4' - methyl - 1' - piperazinylpropyl)phenthiazine.

5. 3 - dimethylsulphamoyl - 10 - [3 - 4' - (2 - hydroxyethyl)-1'-piperazinylpropyl]phenthiazine.

6. 3 - dimethylsulphamoyl - 10 - [3 - 4' - (2 - acetoxyethyl)-1'-piperazinylpropyl]phenthiazine.

References Cited in the file of this patent
UNITED STATES PATENTS

| | | |
|---|---|---|
| 2,534,237 | Cusic | Dec. 19, 1950 |
| 2,645,640 | Charpentier | July 14, 1953 |
| 2,789,978 | Rath | Apr. 23, 1957 |